UNITED STATES PATENT OFFICE.

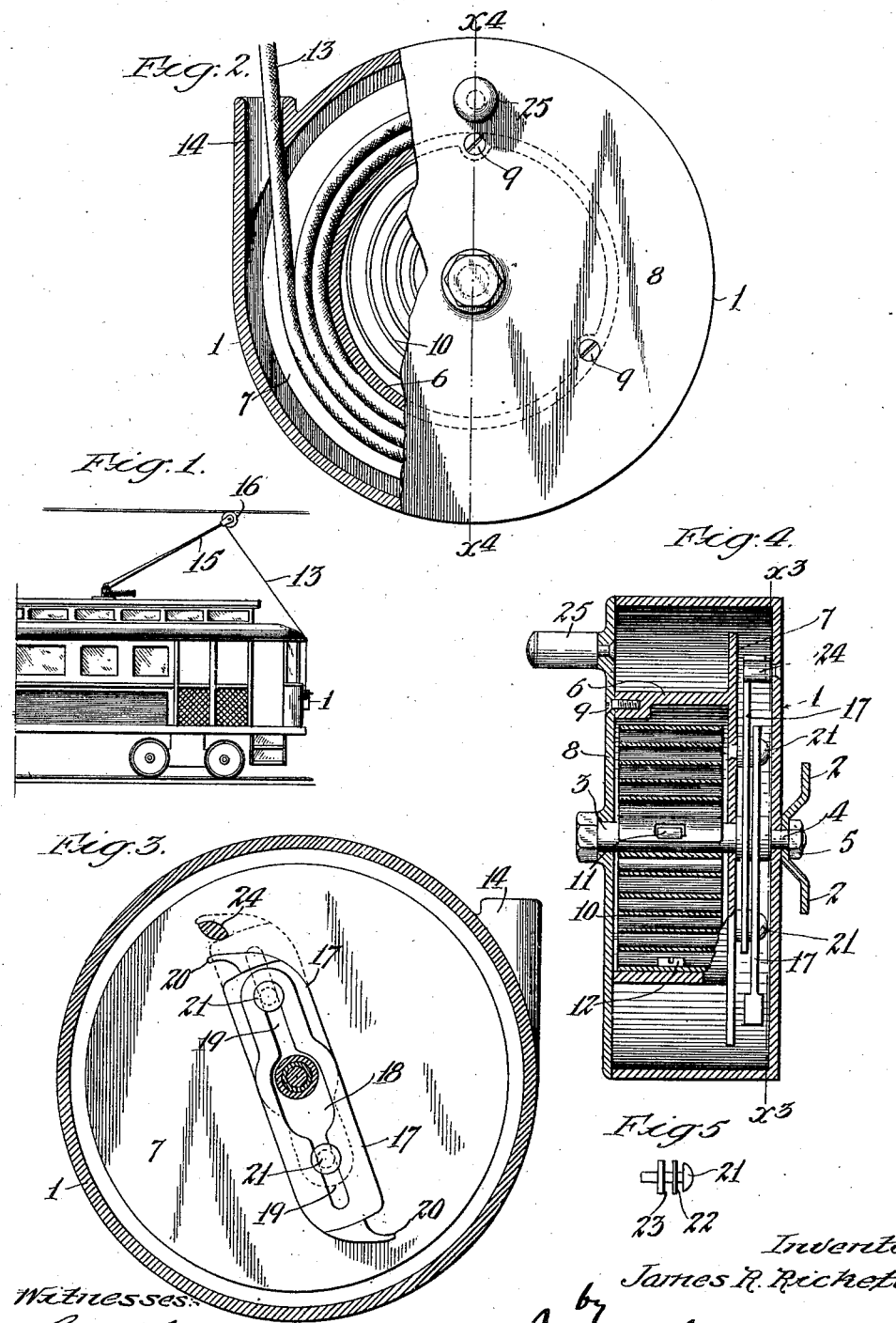

JAMES R. RICKETTS, OF LONGBEACH, CALIFORNIA, ASSIGNOR TO LOS ANGELES TROLLEY CATCHER COMPANY, OF LOS ANGELES, CALIFORNIA.

TROLLEY-CATCHER.

1,030,791. Specification of Letters Patent. Patented June 25, 1912.

Application filed July 27, 1909. Serial No. 509,899.

*To all whom it may concern:*

Be it known that I, JAMES R. RICKETTS, a citizen of the United States, residing at Longbeach, in the county of Los Angeles and State of California, have invented a new and useful Trolley-Catcher, of which the following is a specification.

This invention relates to trolley catchers and the object of the invention is to provide a simple and inexpensive device which may be readily attached to or detached from a trolley car and to which the trolley rope may be connected for automatically arresting the trolley from upward movement when it jumps from the wire, the device acting to automatically take up the slack in the trolley rope or pay out the rope as the trolley rope gradually moves up or down owing to the varying height of the trolley wire as the car moves along, but when the trolley jumps from the wire the device acts to automatically hold the trolley rope against outward movement so that the trolley is held from upward movement when off the wire which prevents it from striking the span wires or other overhead structure, and thus prevents damage.

In carrying out my invention I employ a spring operated reel upon which the trolley rope is wound and a locking mechanism operating by gravity to prevent rotation of the reel whenever it is given a sudden rotation by the trolley jumping from the wire.

Another object is to so construct the locking device that it will operate effectually to lock the reel even though the locking device does not always assume an exact position upon the trolley leaving the wire. This is an important feature as the reel does not always turn with an exact speed every time the trolley leaves the wire, but its speed varies somewhat, which causes a corresponding variation in the swiftness of movement and position assumed by the locking device, which position is automatically corrected by my improvement and results in always positively locking the reel when the trolley flies off.

Referring to the drawings: Figure 1 is a side elevation of a portion of an electric railway car equipped with the invention. Fig. 2 is a front elevation of the invention with part of the case broken away. Fig. 3 is a section on line $x^3$—$x^3$ Fig. 4. Fig. 4 is a section on line $x^4$—$x^4$ Fig. 2. Fig. 5 is a side elevation, in detail, of a dog supporting stud.

The device comprises a hollow drum 1 which is stationary and acts to house and support the mechanism. The drum 1 may be detachably secured to the car by locking arms 2 which are adapted to be engaged with any form of suitable support on the dash of the car, which will enable the device to be readily shifted from one end of the car to the other.

Secured to the drum 1 is a stationary shaft 3 having a reduced end 4 which passes through the drum 1 and is secured by a nut 5. Rotatably mounted on the shaft 3 is a reel 6 provided with an inner flange 7 and secured to a front disk 8 by screws 9. Disk 8 is also journaled on the shaft 3 and rotates with the reel 6. The disk 8 is of the same diameter as the drum 1 so that the mechanism is completely inclosed.

Within the reel 6 is a spiral spring 10, the inner end of which is secured to a lug 11 on the shaft 3, the outer end of the spring being secured by a screw 12 to the reel 6, so that the spring 10 exerts a constant tension on the reel tending to revolve it.

Wound on the reel 6 is the trolley rope 13 which passes out through an orifice 14 in the drum 1, the upper end of the rope 13 being secured to the trolley pole 15 as shown in Fig. 1. The tension of the spring 10 should be sufficient to take up the slack in the trolley rope 13, but not exert any appreciable downward pull on the trolley pole 15, and thus as the car moves along, the trolley pole 15 and its attached trolley 16 rise and fall gradually to coincide with the varying height of the trolley wire. As the trolley pole rises it pulls on the rope 13 and rotates the reel 6, increasing the tension of the spring, while, when the trolley pole rides lower, the spring 10 turns the reel 6 in the opposite direction and takes up all slack in the trolley rope 13.

When the trolley flies off from the wire, the reel 6 is automatically locked against rotation by a device which in preferred form of construction comprises a pair of slidable dogs 17 which are disposed diametrically on the reel 6. Each dog 17 comprises a plate having a central large slot 18 which communicates at each end with narrower slots 19, the outer end of each plate 17 having a hook 20. Both dogs are supported by a pair of studs 21, each stud, as shown clearly in Fig. 5, having two grooves 22 and 23. Each stud 21 is riveted to the back of the reel 6 and the two slots 19 of the innermost dog 17 slide in the grooves 23, while the two slots 19 of the outermost dog 17 slide in the grooves 22. The hook 20 on the end of each plate is sufficiently heavy to cause the plate to slide down by gravity when the hook is at the bottom and also when the hook is at the top. The center slot 18 is of sufficient size to clear the central shaft 3, and also enables the studs 21 to be slipped partially through to enter the grooves 22 and 23 of the studs in the slots 19, after which the studs 21 may be riveted to the back of the reel 6. The locking stud 24 is secured to the drum 1 and is elliptical in cross section as indicated in Fig. 3 and is adapted to be engaged by either of the hooks 20 when the reel partakes of a movement faster than its normal speed of rotation. The stud 24 is located a short distance at one side of a vertical line through the shaft 3, being on the side beyond said line in the direction the reel rotates in paying out the rope, so that the dog will have time to drop before contact with the stud when the reel rotates with its normal speed. As the reel rotates during the normal operation of the car while the trolley is on the wire, the hooks 20 pass under the stud 24 and do not engage the same because as each hook 20 approaches the top its weight causes the slide to slip down, so that the hook passes underneath the post. When, however, the trolley flies off the wire, the reel is given a faster movement than normally and one or the other of the hooks 20 will not have time to slide down by gravity but will engage the stud 24 and thus lock the reel against further rotation, thereby arresting the trolley rope 13 and holding the trolley 16 from rising any farther. If the hook 20 and its slide should have dropped somewhat, but not sufficiently to entirely clear the stud 24, the elliptical shape of the stud 24 combined with the curved shape of the hook 20 will result in causing the hook to ride upwardly and draw the slide farther out, so that the hook will firmly engage the stud whenever the hook is extended sufficiently to strike the stud. This latter feature insures the perfect operation of the device and does not necessitate the hook always assuming the same position when the trolley flies from the wire, but allows for a considerable variation in position of the hook, as is encountered in actual practice. When turning in the other direction in winding up the trolley rope on the reel, the dogs are prevented from catching on the stud by reason of the curved back edges of the dogs, which if either dog should be extended, will strike this elliptical face of the stud and be pushed down thereby. This is important because when the reel turns in this direction the dogs do not have as long a time to drop before reaching the stud as they do when the reel turns the other way, owing to the offset position of the stud. In this manner the reel is never retarded when winding up the rope.

A handle 25 is secured to the disk 8 and enables the reel to be held stationary while the trolley rope is being manipulated in replacing the trolley on the wire, after which the handle 25 is released and the spring at once turns the reel and draws the trolley rope taut.

By employing two sliding dogs 17, the engagement with the stud 24 is effected in half or less than half of a revolution of the reel, so that the trolley is not allowed to rise appreciably above the trolley wire when it leaves the wire.

What I claim is:—

1. A trolley catcher comprising a drum, a reel rotatable in the drum, a spring for actuating the reel in one direction, a pair of dogs slidable radially on the reel, interlocking means on the ends of the dogs and projecting means on the drum adapted to engage and interlock with said interlocking means of either of said dogs and prevent them from rotary or radial movement when the reel moves faster than a definite speed.

2. A trolley catcher comprising a drum, a shaft in the drum, a reel rotatable on said shaft, a spring secured at one end to the shaft and at the other end to the reel, a pair of dogs slidable diametrically on said reel, each dog having a curved hooked shaped end, and a stud elliptical in cross section projecting from the drum and adapted to be engaged by either of the dogs.

3. A trolley catcher comprising a drum, a shaft therein, a reel rotatable on the shaft, a spring within the reel, one end of the spring being secured to the shaft, the other end of the spring being secured to the reel, a pair of studs projecting from the reel, each stud having a pair of grooves, a pair of dogs mounted on the studs, each dog having slots which engage a groove in each stud, and a projection on the drum adapted to be engaged by either dog.

4. A trolley catcher comprising a drum, a reel rotatable in the drum, a shaft supporting said reel, a spring for actuating the reel in one direction, a pair of grooved studs on the reel, a pair of dogs on the reel, each dog comprising a plate with a large central slot which receives said shaft and with two narrower slots which engage grooves in said studs, the outer end of each plate having a hook, and a stud elliptical in cross section projecting from the drum and adapted to be engaged by either hook.

5. A trolley catcher comprising a drum, a reel rotatable in the drum, a shaft supporting said reel, a spring for actuating the reel in one direction, a pair of grooved studs on the reel, a pair of dogs on the reel, each dog comprising a plate with a large central slot which receives said shaft and with two narrower slots which engage grooves in said studs, the outer end of each plate having a hook, a stud elliptical in cross section projecting from the drum and adapted to be engaged by either hook, the front of said reel comprising a disk revoluble on said shaft and extending to the edge of the drum, said disk being secured to the body of the reel, a handle projecting from said disk, and means on the drum for securing the same to a car.

6. A trolley catcher comprising a reel, a pair of dogs slidable diametrically of the reel, each dog having a hook-shaped weighted end, and a stationary projection adapted to be engaged by either hook-shaped end.

7. A trolley catcher comprising a rotatable reel, a dog slidable on the reel, said dog having a hook formed on its end with a curved front edge and a curved rear edge, and a stationary stud substantially elliptical in cross section adapted to be engaged by the front curved edge of said hook when the reel turns in one direction faster than a definite speed, said stud adapted to bear against the rear curved edge of said hook when the reel turns in the opposite direction, and thereby cause the hook to ride under said stud without engaging the same.

8. In a trolley catcher comprising a rotatable reel, a dog slidable diametrically of said reel, said dog having a hook on one end, and a stationary stud located on one side of a vertical line through the axis of said reel, being on the side beyond said line in the direction the reel rotates in paying out the rope, whereby the dog is allowed extra time to drop before striking the stud.

In testimony whereof, I have hereunto set my hand at Los Angeles, Cal. this 21st day of July 1909.

JAMES R. RICKETTS.

In presence of—
G. F. HACKLEY,
FRANK L. A. GRAHAM.

Copies of this patent may be obtained for five cents each, by addressing the "Commissioner of Patents, Washington, D. C."